May 14, 1935.    R. B. DAY    2,001,185

PROCESS OF ELIMINATING IMPURITIES FROM GASOLINE

Filed Feb. 21, 1931.

Inventor
Roland B. Day.
By Stone, Boyden, Mack & Haley
Attorneys

Patented May 14, 1935

2,001,185

UNITED STATES PATENT OFFICE 2,001,185

PROCESS OF ELIMINATING IMPURITIES FROM GASOLINE

Roland B. Day, Palos Verdes Estates, Calif., assignor to Universal Oil Products Company, Chicago, Ill., a corporation of South Dakota Application February 21, 1931, Serial No. 517,601

9 Claims. (Cl. 196—36)

This invention relates to a process for treating products of petroleum distillation or pyrogenetic decomposition, as well as natural gasolines for the purpose of improving the same as to color, odor, doctor test, and other characteristics desirable in a commercial product.

The present invention constitutes an improvement over the invention set forth in my copending application, Serial No. 488,112 filed Oct. 11, 1930 in which is described a process for contacting light hydrocarbon vapors with hydrochloric acid.

The method as carried out in accordance with this invention is particularly concerned with the elimination of sulphur and gums from gasoline by continuous treatment of the gasoline in the vapor phase with hydrochloric acid and other materials capable of effecting a removal of sulphur and a polymerization of other undesirable constituents whereby these may be readily removed.

It has been more or less common to treat the distilled or cracked vapors from hydrocarbon oils with metallic chloride for the purpose of causing the recombination of the constituents into lighter forms. Many disadvantages have attended this type of process, however, and these disadvantages have been due in no small degree to the difficulty experienced in handling the metallic halide.

It has been discovered that a marked saving in time and expense can be accomplished by contacting in the presence of hydrochloric acid and steam, the gasoline or other light hydrocarbon in vapor phase with an aqueous solution of a chloride or oxide of a metal whose sulphides are soluble in hydrochloric acid, holding in suspension or solution a chloride or oxide of a metal whose sulphides are insoluble in hydrochloric acid. Examples of the metals forming soluble sulphides are zinc, aluminum, iron, and cadmium, while examples of those metals forming insoluble sulphides are copper, mercury, silver, and nickel and cobalt, the latter two metals being very slightly soluble.

The zinc or other chloride in aqueous solution can be held liquid by the use of a moderate amount of steam and the presence in the solution of the chloride of another metal, such as copper, whose sulphide is insoluble in hydrochloric acid makes possible the desired reduction in sulphur content of the hydrocarbon. The solubility of the metal chlorides differs to a large extent. For instance, with copper, cuprous chloride is insoluble in water while cupric chloride is soluble. The specific weight of the zinc chloride or oxide solution permits the solution to hold in suspension any of the other metal chlorides or oxides even though these other metal chlorides or oxides be insoluble.

It has already been proposed to treat hydrocarbon vapors with metallic chlorides in a liquid-vapor contacting apparatus, adding steam to maintain the halide in solution. In such a process, however, a certain amount of the chloride hydrolyzes forming solid or semi-solid intermediate reaction products. For example, using zinc chloride, a large percentage of the chloride hydrolyzes to form zinc oxychloride, as follows:

Also, in the reaction of the zinc chloride with the oil, (where R represents the reactive hydrocarbon radicles) the following hydrolysis occurs:—

or

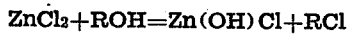

In any event, a very large percentage of the zinc chloride is converted to oxychloride of zinc which is a solid and forms emulsions with the heavy ends of the gasoline, the tars formed, and the remaining zinc chloride solution. It is necessary, in order to recover the zinc chloride for further use as a reagent, to take the zinc chloride sludge as it leaves the bottom of the tower, and dilute it with water, which releases the tar and oil, which is skimmed from the top of the tank. The zinc chloride with the finely divided zinc oxychloride is pumped through a suitable filter where the zinc oxychloride is removed and discarded while the solution of zinc chloride is reconcentrated to treating strength and pumped back into the tower.

In contrast to the foregoing, it is an object of this invention to effect an efficient reaction between metallic chloride and light cracked hydrocarbon products or distillates in a contacting apparatus without the formation of solid intermediate products.

This invention consists broadly in contacting a light hydrocarbon fraction, such as gasoline with a solution of a chloride of a metal, such as zinc, whose sulphide is soluble in hydrochloric acid, this solution holding in suspension or solution a reactive compound, such as the chloride or oxide, of a metal such as copper whose sulphide is insoluble in hydrochloric acid. To the light hydrocarbon fraction is added sufficient steam to effect solution of the zinc or other chloride and maintain the solution at any desired concentration by control of the vapor pressure, and sufficient hydrochloric acid to keep the balance of the reactions on the acid side so that hydrolysis will be defeated and no accumulation of solid oxychloride will occur. Air or oxygen may also be added at a suitable point before or after entry of the hydrocarbon vapors into the contacting apparatus, as it is found that the oxygen exerts a beneficial effect in retarding the formation of undesirable sulphur compounds.

The invention may be more readily understood if reference is had to the accompanying drawing, in which.

Figure 1:
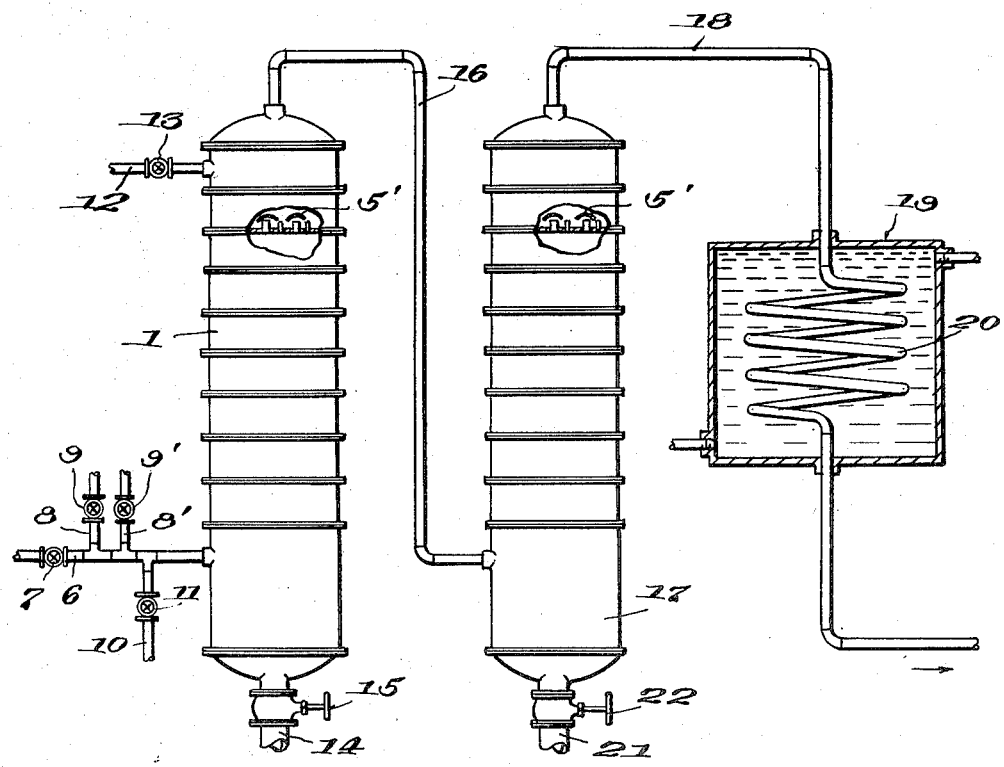
Fig. 1 represents diagrammatically an apparatus in which the present invention may be carried out.
Figure 2:
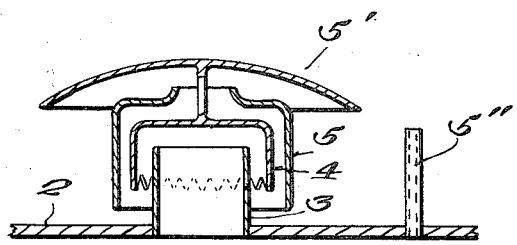
Fig. 2 represents an enlarged view of one of the bubble-caps recommended for use, and indicated diagrammatically in the broken away portion of Fig. 1.

Referring to the drawing, 1 represents a treating unit of the bubble-cap tower type, the bubble-caps being preferably of the type shown and described in my copending application, Serial No. 394,763, filed September 24, 1929. This type of bubble-cap tower is illustrated in Fig. 2, in which 2 represents a horizontal bubble-tray having a plurality of openings therein, each opening having its wall formed annularly as a single piece 3, extending upwardly as a pipe. 4 is a primary baffle covering the mouth of pipe 3 and spaced therefrom and having a downwardly flanged lower portion and a serrated lower edge. 5 represents a second baffle, annular in form, surrounding the primary baffle adjacent to its flanged portion and curved upwardly near its upper lip or edge, and 5' represents a cap for preventing splashing around the upper edge of the annular baffle. This construction has been found to furnish an intimate vapor-liquid contact, the vapor passing downwardly under the serrated lower edge of baffle 4 where it is broken up into bubbles, the bubbles rising with liquid around interior of annular baffle 5.

6 represents an inlet pipe for gasoline or other light hydrocarbon vapors, introduced from any suitable source, such as a cracking still for example. This pipe is provided with valve 7 and leads into treating unit 1 near the lower end thereof. Leading into pipe 6 at suitable points are branch pipe 8, for the admission of steam, whose flow is controlled by valve 9, pipe 8' for the admission of air, controlled by valve 9', and branch pipe 10, for the admission of hydrochloric acid gas from any suitable source, the flow of this gas being regulated by manipulating a valve 11. 12 represents a pipe leading into the upper part of treating unit 1 for the admission of a solution of one of the chlorides of a metal, such as zinc, whose sulphides are soluble in hydrochloric acid, holding in suspension a chloride or oxide of a metal such as copper, whose sulphides are insoluble in hydrochloric acid, this pipe being provided with valve 13, and 14 represents a pipe leading from the bottom of treating unit 1 for the withdrawal of spent metal chloride, this withdrawal pipe being provided with valve 15. From the top of treating unit 1 a pipe 16 leads to the bottom of a fractionating tower 17, this second unit being similar in construction to the first treating unit, but which is really a bubble-cap fractionating apparatus for making end-point gasoline. This tower is provided with an outlet pipe 18 near the top thereof leading to condenser 19, and through condenser coil 20 to storage. An outlet pipe 21, provided with valve 22, leads from the bottom of fractionating tower 17 to conduct away heavy ends or "bottoms". Pipes 16 and 18 may be provided with valves if it is desirable or necessary. A short pipe (not shown) provided with a control valve may lead into the downgoing vertical portion of pipe 18, for the introduction of ammonia.

In the operation of the improved process as carried out in accordance with the present invention, valve 13 is opened and an aqueous solution of one of the chlorides of a metal, such as zinc, whose sulphides are soluble in hydrochloric acid, holding in suspension a chloride or oxide of a metal, such as copper, whose sulphides are insoluble in hydrochloric acid, enters pipe 12 and builds up on the trays inside the unit and commences to overflow from one tray to the next. Valves 7, 9, 11 and 9', in case it is desired to use air, are opened to the required extent and gasoline vapors, steam, and air begin to flow upwardly, and contact with the downflowing liquid contacting agent on the bubble trays. A prolonged and efficient contact is thus secured, the hydrochloric acid gas reacting with the hydrocarbon over the contacting agent. Sufficient hydrochloric acid gas is added to the inflowing hydrocarbon vapors so that the hydrochloric acid will immediately decompose any oxy-compounds formed from the liquid contacting agent as fast as formed. For instance, in the case of zinc chloride, any zinc oxychloride would be decomposed as follows:—

$$Zn(OH)Cl + HCl = ZnCl_2 + H_2O$$

As long as the balance is maintained on the acid side of the equation by the addition of sufficient hydrochloric acid, no accumulation of the solid will occur. Sludge will accumulate at the bottom of treating unit 1 and may be drawn off through pipe 14 by opening valve 15, but this sludge will contain only the tars and heavy polymers which can be easily removed without filtration. No zinc chloride is used up, and this fact constitutes a marked saving in expense, as zinc chloride costs about $0.05 per pound against $0.008 per pound as the cost of hydrochloric acid. A marked saving in time is also effected by enabling the refinery operators to dispense with the laborious operation of filtration. Enough steam is admitted through pipe 8 to maintain the metallic chloride in solution at any desired concentration. In practice a steam content by liquid volume of 15% will give a zinc chloride concentration of about 70° Baumé, a 10% content, a concentration of 80° Baumé, and so on. The treated gasoline or other hydrocarbon vapors leaving treating unit 1 by pipe 16 pass into fractionating tower 17 where they are rectified to end-point gasoline, the bottom being removed by pipe 21. The lighter fractions from tower 17 are conducted by pipe 18 through condenser 20 surrounded by water jacket 19, where they are condensed and the condensate conducted to storage. Ammonia may be introduced through pipe 18 to neutralize any hydrochloric acid coming over with the vapors.

If air is introduced along with the steam and hydrocarbon vapors, its rate of supply must be carefully controlled, since an excess of air will tend to injure the color of the finished gasoline.

In case the metal oxides are used instead of the chlorides, the addition of air is unnecessary, because the oxygen liberated from the oxides will act to decompose the sulphides formed.

I claim:

1. A process for refining hydrocarbon vapors which comprises adding hydrogen chloride and steam to the vapors, and contacting the vapors in the presence of the added hydrogen chloride and steam with an aqueous solution of a water soluble chloride of a metal whose sulphide is substantially soluble in hydrochloric acid, said solution containing a reactive compound having the character and action of the chlorides and oxides of the metals whose sulphides are substantially insoluble in hydrochloric acid.

2. A process for refining hydrocarbon vapors which comprises adding hydrogen chloride and steam to the vapors, and contacting the vapors in the presence of the added hydrogen chloride and steam with an aqueous solution of zinc chloride containing a reactive compound having the character and action of the chlorides and oxides of the metals whose sulphides are substantially insoluble in hydrochloric acid.

3. A process for refining hydrocarbon vapors which comprises adding hydrogen chloride and steam to the vapors, and contacting the vapors in the presence of the added hydrogen chloride and steam with an aqueous solution of a water soluble chloride of a metal whose sulphide is substantially soluble in hydrochloric acid, said solution containing a chloride of a metal whose sulphide is substantially insoluble in hydrochloric acid.

4. A process for refining hydrocarbon vapors which comprises adding hydrogen chloride and steam to the vapors, and contacting the vapors in the presence of the added hydrogen chloride and steam with an aqueous solution of a water soluble chloride of a metal whose sulphide is substantially soluble in hydrochloric acid, said solution containing an oxide of a metal whose sulphide is substantially insoluble in hydrochloric acid.

5. A process for refining hydrocarbon vapors which comprises adding hydrogen chloride and steam to the vapors, and contacting the vapors in the presence of the added hydrogen chloride and steam with an aqueous solution of zinc chloride containing a chloride of a metal whose sulphide is substantially insoluble in hydrochloric acid.

6. A process for refining hydrocarbon vapors which comprises adding hydrogen chloride and steam to the vapors, and contacting the vapors in the presence of the added hydrogen chloride and steam with an aqueous solution of zinc chloride containing an oxide of a metal whose sulphide is substantially insoluble in hydrochloric acid.

7. A process for refining hydrocarbon vapors which comprises adding hydrogen chloride and steam to the vapors, and contacting the vapors in the presence of the added hydrogen chloride and steam with an aqueous solution of zinc chloride containing copper chloride.

8. A process for refining hydrocarbon vapors which comprises adding hydrogen chloride and steam to the vapors, and contacting the vapors in the presence of the added hydrogen chloride and steam with an aqueous solution of zinc chloride containing copper oxide.

9. A process for refining hydrocarbon vapors which comprises adding hydrogen chloride and steam to the vapors, and contacting the vapors in the presence of the added hydrogen chloride and steam with an aqueous solution of a water soluble chloride of a metal whose sulphide is substantially soluble in hydrochloric acid, said solution containing a reactive compound selected from the group consisting of the chlorides and oxides of metals whose sulphides are substantially insoluble in hydrochloric acid.

ROLAND B. DAY.